Nov. 15, 1949     D. K. STEPHENS     2,487,991
EXPANSION PLUG FOR PIPE
Filed Feb. 18, 1946     2 Sheets—Sheet 1
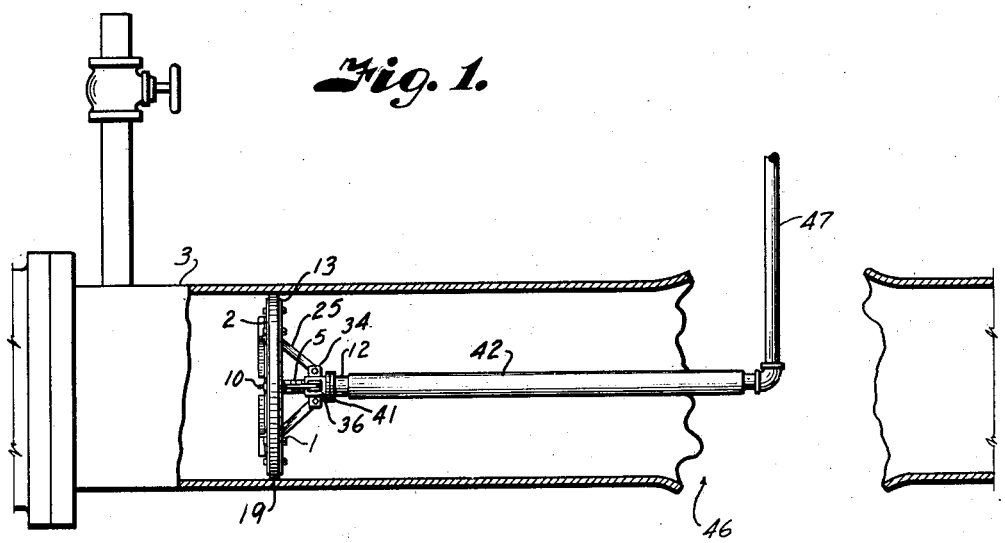
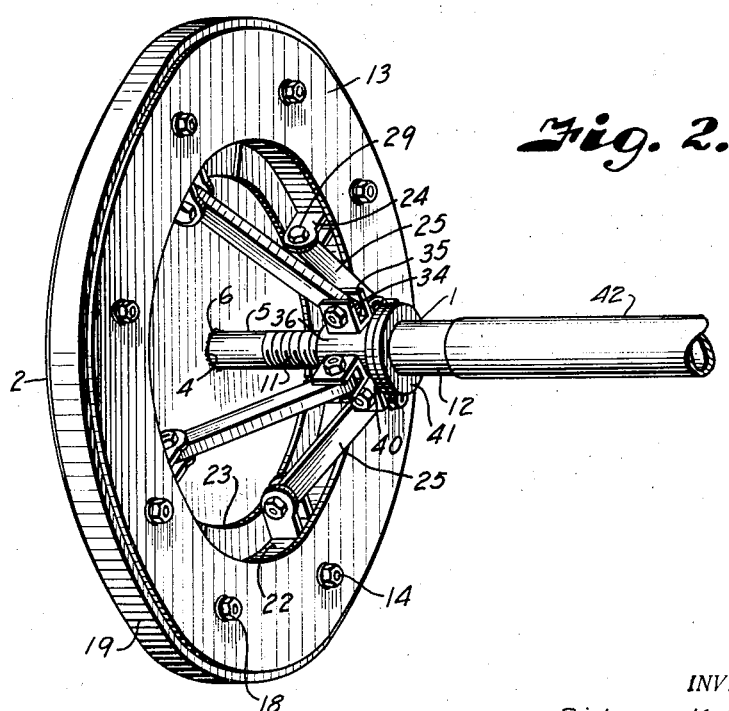
INVENTOR.
Dishman K. Stephens
BY
Fishburn + Mullendore
ATTORNEYS Nov. 15, 1949  D. K. STEPHENS  2,487,991
EXPANSION PLUG FOR PIPE
Filed Feb. 18, 1946  2 Sheets-Sheet 2
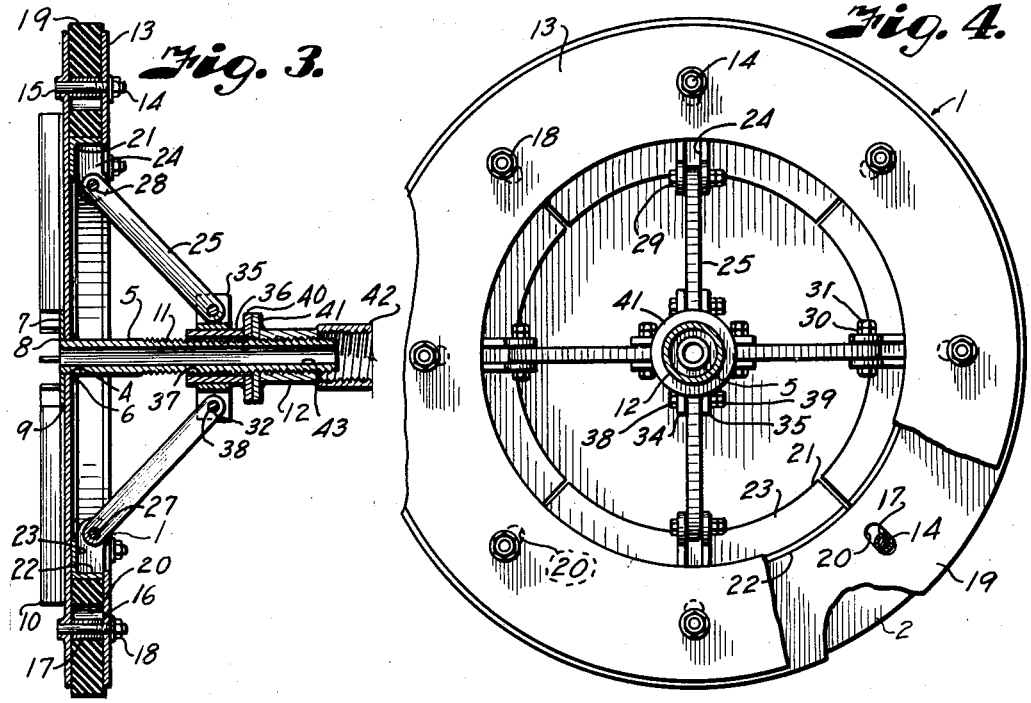
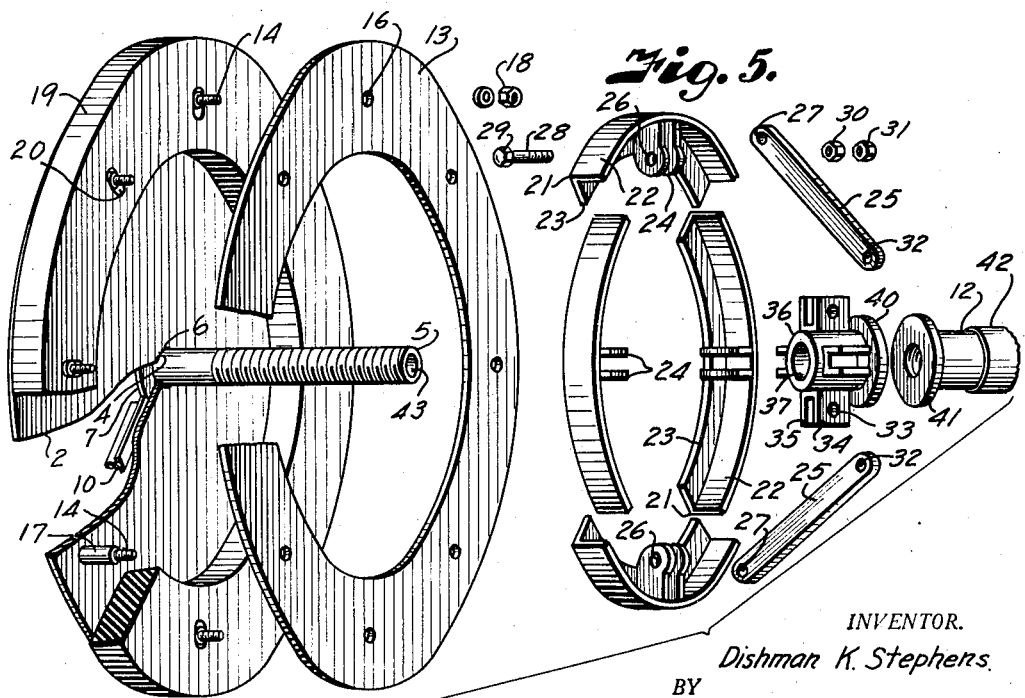
INVENTOR.
Dishman K. Stephens
BY
Fishburn & Mullendore
ATTORNEYS.

Patented Nov. 15, 1949

2,487,991

UNITED STATES PATENT OFFICE 2,487,991

EXPANSION PLUG FOR PIPE

Dishman K. Stephens, Kansas City, Mo., assignor to Panhandle Eastern Pipe Line Company, Kansas City, Mo., a corporation of Delaware Application February 18, 1946, Serial No. 648,286

5 Claims. (Cl. 138—90)

1

This invention relates to an expansion plug for pipe, and more particularly to a device for preventing flow of gas in a gas pipe line to the area where a cutting torch is being used on said pipe line.

The principal object of the present invention is to provide means movable into a gas pipe line for stopping flow of gas in said line.

Pipe lines employed for transmitting fluid, such as natural gas, sometimes become ruptured from various causes. When a rupture occurs a valve near the break is closed to prevent further flow and loss of gas. It is important that repairs be made immediately to restore gas service to the consumers, but the presence of gas in the vicinity of the break prevents the use of cutting torches until the gas has been cleared from the vicinity. The clearing of the line takes time and delays repairs. The present invention is to safeguard the use of torches and enable the immediate start of repairs by stopping flow of gas into the vicinity of the break and directing the gas remaining in the line to a point remote from the torches.

Other objects of the present invention are to provide an expansible plug for a pipe line; to provide an expansion plug of relatively small width which may be inserted in a pipe line at a break therein and moved into the pipe to a point spaced from the break, then expanded to seal the pipe, preventing flow of gas to the break; to provide for release of gas pressure in the pipe line to prevent said pressure from forcing the plug out of the line; to provide for escape of the gas remaining in the pipe line during the use of cutting torches preparatory to further repair of said pipe line; to provide a resilient member in the plug for expansion into sealing engagement with the pipe; to provide friction engagement between the plug and the pipe for holding the plug during expansion of same; and to provide a durable, relatively economical and highly efficient expansion plug for a pipe line.

In accomplishing these and other objects of the present invention, I have provided improved details of structure, the preferred forms of which are illustrated in the accompanying drawings wherein:

Fig. 1 is an elevational view of an expansion plug embodying the features of the present invention shown in operative position as applied to a ruptured pipe line.

Fig. 2 is a perspective view of the expansion plug illustrating the arrangement of the expansion control members.

2

Fig. 3 is a vertical section through the expansion plug particularly illustrating the relation of the pipe sealing element thereto.

Fig. 4 is an end elevation of the expansion plug.

Fig. 5 is a detailed perspective view of the expansion plug, the parts thereof being shown in spaced relation and partly broken away to better illustrate their construction.

Referring more in detail to the drawings:

I generally designates an expansion plug constructed in accordance with the preferred form of the invention for stopping flow of gas in a ruptured pipe line or the like. The plug preferably consists of a circular plate 2 having an outside diameter smaller than the inside diameter of a pipe 3 to which it is adapted to be applied. The plate 2 is provided with a central opening 4 through which is extended a tubular member 5, said tubular member being welded to the inner side of the plate as at 6. A ring 7 is sleeved over a portion of the tubular member extending on the outer side of the plate and welded to the tubular member as at 8 to provide a bearing support for the tubular member, the periphery of the ring 7 being welded to the plate 2 as at 9. The outer side of the plate 2 is also provided with a plurality of stiffening members 10 preferably in the shape of T bars, said T bars extending radially from the periphery of the ring 7 and having the flanges of said bars welded to the outer surface of the plate 2. The portion of the tubular member 5 extending from the inner surface of plate 2 is provided with external threads 11 to threadingly receive a collar 12 as later described.

A ring 13 having substantially the same outside diameter as the plate 2 is secured to said plate by means of a plurality of studs 14 which are fastened to the plate 2 as at 15 and extend through aligning apertures 16 in the ring 13. The ring 13 is maintained in spaced relation to the plate 2 by tubular spacers 17 sleeved over the studs, the plate, spacers and ring 13 being held in a rigid assembly by nuts 18 threaded on the end of said stud. This arrangement provides a space between the plate 2 and the ring 13 adapted to receive a packing ring 19 of resilient material such as rubber or the like, having a normal outer diameter slightly smaller than the pipe in which the plug is to be inserted. The packing ring is provided with a plurality of elongated apertures 20 adapted to align with the studs 14 on the plate 2, said apertures 20 being of such size as to pass freely over the spacers 17 to permit radial movement of the packing ring so that it may be extended into engagement with the inside of a pipe 3. The inner diameter of the packing ring 19 is slightly larger than the inner diameter of the ring 13 and is adapted to be engaged by a plurality of shoes 21 preferably consisting of arcuate flanges 22 of such width that they may pass freely between the ring 13 and the plate 2 to engage the packing ring 19. The shoes 21 are provided with inwardly extending flanges 23 adapted to engage the inner surface of the plate 2 to provide bearing supports for the shoes 21. The shoes 21 are provided with centrally arranged spaced bosses 24 adapted to receive the ends of toggle links 25 therebetween. The bosses 24 are provided with apertures 26 aligning with apertures 27 in the toggle links to receive the shanks 28 of bolts 29. The bolts provide a pivotal connection between the toggle links and the shoes, said bolts being held in place by nuts 30 and 31. The outer ends of the toggle links 25 are provided with apertures 32 adapted to align with apertures 33 in spaced ears 34 and 35 on a sleeve 36 having a bore 37 slidable over the tubular member 5. Bolts 38 extend through the respective apertures 32 and 33 to provide pivotal connection between the links 25 and the sleeve 36, said bolts being locked in place by nuts 39. The outer end of the sleeve 36 is provided with a flange 40 adapted to be engaged by a flange 41 on the inner end of the collar 12, whereby threading the collar 12 on the tubular member 5 moves the sleeve 36 on said member 5 toward the plate 2 and the shoes 21 outwardly to expand the resilient packing ring 19. The collar 12 may be provided with a tubular extension 42 which may be welded to said collar or connected by suitable pipe connections whereby the bore 43 of the tubular member 5 communicates with the bore of the tubular extension 42 to provide a duct for carrying gas to a remote point.

The use of an expansion plug constructed and assembled as described, particularly in sealing a gas pipe line 3 having a rupture 46 therein, is as follows:

When a pipe is ruptured, the nearest valve thereto controlling flow through the line is closed. However, there is sufficient gas remaining in the line to prevent the use of cutting torches in the area of the rupture. In order to stop flow of gas to the ruptured area of the pipe 3, an expansion plug 1 is inserted into the break and expanded until the packing ring 19 engages the inside of said pipe. The expansion plug is very narrow and is thereby adapted to be inserted in any type of break in the pipe, whether the pipe be flattened or split, as the collar 12 may be removed from the tubular member 5 before insertion of the plug into said pipe. After the plug is inserted in the pipe, the extension member and collar 12 are inserted in the pipe and the collar threaded on the tubular member 5, the flange 41 on the collar 12 engaging the flange 40 on the sleeve to force said sleeve toward the plate 2 and the shoes 21 outwardly against the packing ring 19 by action of the toggle links 25. The links may be held by the operator to prevent turning of the tubular member 5 while the collar 12 is being threaded thereon until there is sufficient frictional engagement between the packing ring 19 and the pipe 3 to hold said plug stationary during continuous threading movement of the collar 12. The plug may be then moved further into the pipe away from the break 46 and after it has been moved a sufficient distance, the extension 42 may be rotated to turn the collar 12 to further move the sleeve 36 toward the plate 2, thereby exerting pressure through the toggle links 25 and the shoes 21 to force the packing ring into sealing engagement with the interior of the pipe 3. The passage in the tubular member 5 and extension 42 may be closed, but an increase of pressure in the pipe line sufficient to force the plug back towards the break in said line is possible. Therefore, it is preferable that the passage in the tubular member 5 and extension 42 be open to permit gas to flow therethrough and prevent a build-up of pressure in the line. In order to convey the gas away from the vicinity of the break, additional pipe fittings 47 are preferably applied to the end of the extension 42, the end of the pipe fittings 47 being open to permit escape of the gas which is ignited to prevent any danger therefrom.

It is obvious the present invention when applied to a ruptured pipe as described will prevent the presence of gas around the rupture or break in said line and permit the use of a cutting torch for squaring the ends of the pipe 3 in preparation for further repairs on the pipe. When the ends of the pipe are squared and there is no further use for cutting torches in that area, the pipe fittings 47 may be removed and the extension 42 rotated to turn the collar 12 on the threaded portion 11 of the tubular member 5, permitting the shoes 21 to be retracted from the resilient packing ring until such packing ring no longer engages the pipe. The plug may then be removed from the pipe line 3 and further repairs made thereon as in conventional practice.

What I claim and desire to secure by Letters Patent is:

1. In an apparatus of the character described, a gas pipe line having a ruptured portion, an expansion plug for the pipe line including a circular plate, a coaxial tubular shaft member extending from said plate and having screw threads thereon spaced from said plate, said tubular shaft having communication with the pipe line on the opposite side of said plate, a ring secured to said plate in spaced relation thereto, a resilient member filling the space between the plate and ring, tubular means having one end threadedly engaged with the shaft member for moving the plug into the line to a point spaced from the point of rupture, and means movable on the shaft member in response to rotation of the tubular means and having operative engagement with the resilient member for expanding said resilient member into sealing engagement with the pipe, said tubular plug moving means and having communication through the tubular shaft with the pipe line for transmitting any gas therein to a point remote from the point of rupture of said pipe line.

2. In an apparatus of the character described, a circular plate, a coaxial tubular shaft member extending from said plate in perpendicular relation thereto, a ring spaced from the plate, means securing the ring to said plate, a resilient member filling the space between the plate and ring, shoes engaging the resilient member, means movable on the shaft member, and links on said movable means having connection with said shoes for moving the resilient member outwardly relatively of the ring and plate for engaging a pipe to be sealed in response to movement of said movable means on the shaft member.

3. In an apparatus of the character described, a circular plate, a coaxial tubular shaft member extending from said plate in perpendicular relation thereto, a ring secured to said plate in spaced relation thereto, a resilient member filling the space between the plate and ring, a sleeve movable on the shaft, shoes engaging the resilient member, links operatively connecting the sleeve with the shoes, and means for moving the sleeve on the shaft member for causing the shoes to force the resilient member outwardly into sealing engagement with a pipe to be sealed.

4. In an apparatus of the character described, a circular plate, a coaxial shaft member extending from said plate in perpendicular relation thereto, said shaft having screw threads thereon in spaced relation to the plate, a ring secured to said plate in spaced relation thereto, a resilient member filling the space between the plate and ring, a sleeve slidable on the shaft, shoes engaging the resilient member, links operatively connecting the sleeve with the shoes, and means threadedly engaging the threads on the shaft and rotatable thereon for moving the sleeve on the shaft member in response to said rotation for causing the shoes to force the resilient member outwardly into sealing engagement with the pipe to be sealed.

5. An expansion plug for sealing a ruptured gas pipe line at a point remote from the rupture comprising, a circular plate, a coaxial tubular shaft member extending from said plate in perpendicular relation thereto and having communication with the pipe line on the opposite side of said plate, said tubular shaft having screw threads thereon in spaced relation to the plate, a ring secured to said plate in spaced relation thereto, a resilient member filling the space between the plate and ring, a sleeve slidable on the tubular shaft, shoes engaging the resilient member, links operatively connecting the sleeve with the shoes, and tubular means having one end thereof threadedly engaged with the shaft for moving the plug into the pipe line to a point spaced from the point of rupture, said tubular means having communication through the tubular shaft with the pipe line for transmitting any gas therein to a point remote from the point of rupture, said tubular means engaging the sleeve for moving same on the shaft member in response to rotation of said tubular means for causing the shoes to force the resilient member outwardly into sealing engagement with the pipe.

DISHMAN K. STEPHENS.

REFERENCES CITED

The following references are of record in the file of this patent:

UNITED STATES PATENTS

| Number | Name | Date |
| --- | --- | --- |
| 411,978 | Chisholm | Oct. 1, 1889 |
| 705,059 | Flynn | July 22, 1902 |
| 1,233,214 | Frew | July 10, 1917 |